(12) United States Patent
Nektalov

(10) Patent No.: US 12,032,433 B2
(45) Date of Patent: Jul. 9, 2024

(54) DATA STRUCTURE VALIDATION USING INJECTED DYNAMIC BEHAVIOR

(71) Applicant: JPMorgan Chase Bank, N.A., New York, NY (US)

(72) Inventor: Simon Nektalov, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 132 days.

(21) Appl. No.: 17/691,940

(22) Filed: Mar. 10, 2022

(65) Prior Publication Data

US 2023/0289251 A1   Sep. 14, 2023

(51) Int. Cl.
*G06F 16/215* (2019.01)
*G06F 11/07* (2006.01)
*G06F 11/36* (2006.01)
*G06F 16/28* (2019.01)

(52) U.S. Cl.
CPC ...... *G06F 11/0784* (2013.01); *G06F 11/3608* (2013.01); *G06F 16/215* (2019.01); *G06F 16/289* (2019.01)

(58) Field of Classification Search
None
See application file for complete search history.

(56) References Cited

U.S. PATENT DOCUMENTS

| | | | |
|---|---|---|---|
| 2005/0055631 A1* | 3/2005 | Scardina | G06F 40/221 715/230 |
| 2006/0206502 A1* | 9/2006 | Gaurav | G06F 16/258 |
| 2008/0307262 A1* | 12/2008 | Carlin, III | G06F 16/215 714/E11.002 |
| 2018/0107694 A1* | 4/2018 | Dupey | G06F 16/2365 |
| 2020/0210401 A1* | 7/2020 | Swami | G06F 16/215 |

* cited by examiner

*Primary Examiner* — Eddy Cheung
(74) *Attorney, Agent, or Firm* — Greenblum & Bernstein, P.L.C.

(57) ABSTRACT

Implementations generally relate to validating data files. In some implementations, a method includes receiving at least one schema file, where the at least one schema file includes data fields. The method further includes adding annotations to the at least one schema file. The method further includes generating an object model based on the at least one schema file and the annotations. The method further includes receiving at least one data file. The method further includes validating the at least one data file based on the object model to ensure that the at least one data file complies with a requirements contract.

20 Claims, 4 Drawing Sheets

400

DATA STRUCTURE VALIDATION USING INJECTED DYNAMIC BEHAVIOR

BACKGROUND

Financial technology (Fintech) is an emerging industry that uses technology to improve activities in finance. For example, Fintech enables financial services to be more accessible to the general public with the use of mobile devices such as smartphones for mobile banking, investing, borrowing services, cryptocurrency, etc. Fintech may utilize data serialization frameworks, which use JavaScript Object Notation (JSON) for defining data types and protocols, and serialize data in a compact binary format. A data serialization framework uses a schema to structure data that is being encoded. Message payloads in JSON files may have various problems with JSON structure, property names, property values and property value format. Developers typically manually develop and implement validation logic to validate received data.

DETAILED DESCRIPTION

Fintech technology may be used to improve or augment financial activities, as indicated above. Providing financial information to internal and external customers of a financial institution may involve development of user interfaces and associated configurations and functions. Such development typically involves software development manually handling data files and validation of such data files, which is time consuming and tedious.

Implementations validate structure, property names, and values of received data files such as JSON files via HTTP response or messaging middleware. Implementations operate using a requirements contract between upstream and downstream applications via messages or events.

Implementations apply annotations that inject validation behavior into an object model, which is generated from schema files. Implementations use the object model to validate received data files such as JSON files with no coding or with minimum coding. This validation framework may be leveraged by any application(s) using a schema or requirements contract to communicate with any upstream or downstream systems. Validations are easy to configure and implement by extending existing predefined generic rules. Injected validation behavior enables the system to validate incoming or outgoing data on the fly.

As described in more detail herein, in various implementations, a system receives a schema file and adds annotations to the schema file. The system further generates an object model based on the schema file and the annotations. When the system receives an incoming data file, the system validates the data file based on the object model to ensure that the data file complies with a requirements contract.

Figure 1:
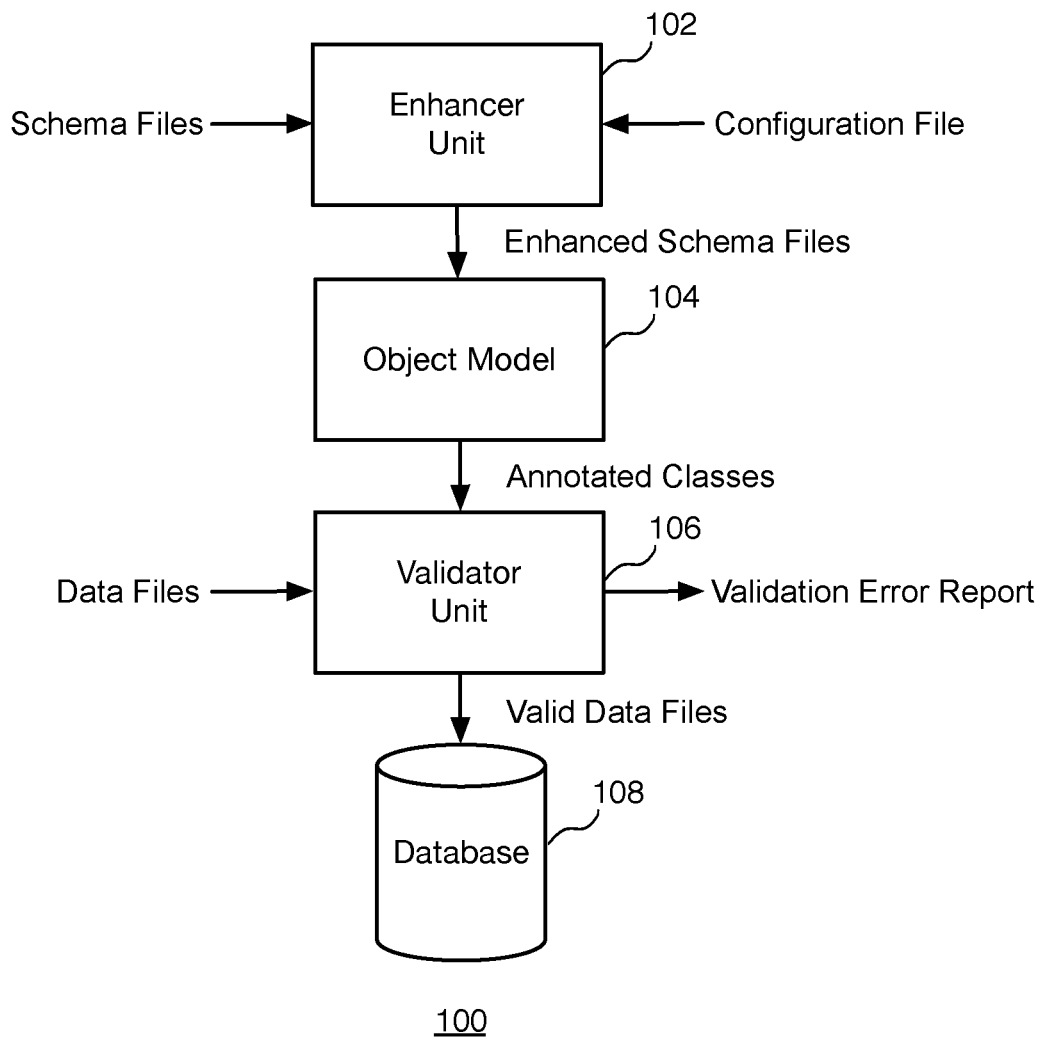
FIG. 1 is a block diagram of an example system for validating data files, which may be used for implementations described herein.

FIG. 1 is a block diagram of an example system 100 for validating data files, which may be used for implementations described herein. As shown, system 100 includes an enhancer unit 102, an object model 104, a validator unit 106, and a database 108. Operations of system 100 are described in more detail below in connection with FIG. 2.

For ease of illustration, FIG. 1 shows one block for each of enhancer unit 102, object model 104, validator unit 106, and database 108. Blocks 102, 104, 106, and 108 may each represent multiple respective enhancer units, object models, validator units, and databases. In other implementations, system 100 may not have all of the components shown and/or may have other elements including other types of elements instead of, or in addition to, those shown herein.

While system 100 performs implementations described herein, in other implementations, any suitable component or combination of components associated with system 100 or any suitable processor or processors associated with system 100 may facilitate performing the implementations described herein.

Figure 2:
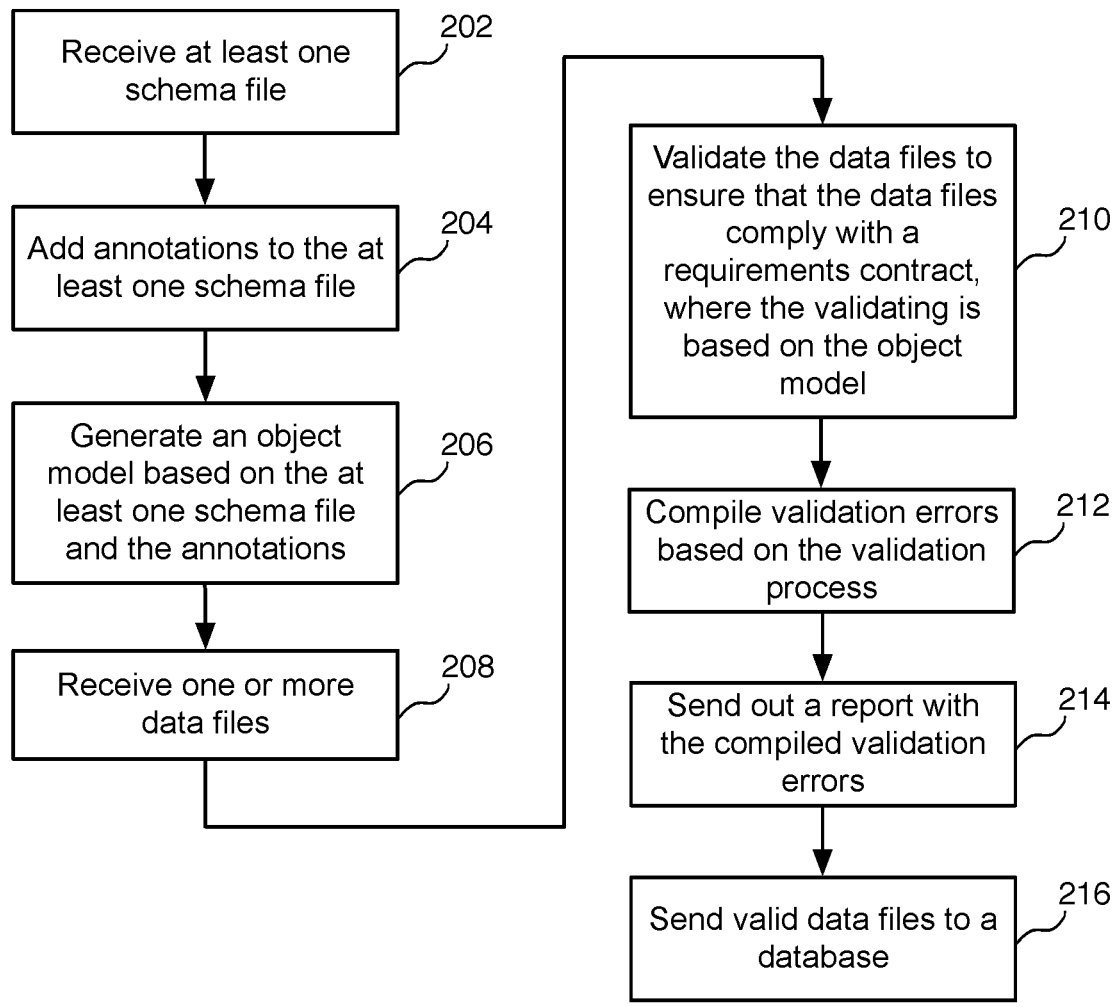
FIG. 2 is an example flow diagram for validating data files, according to some implementations.

FIG. 2 is an example flow diagram for validating data files, according to some implementations. Referring to both FIGS. 1 and 2, a method begins at block 202, where a system such as system 100 receives one or more schema files. In various implementations, the system may receive the configuration information by passively receiving the configuration information and/or actively requesting or fetching the configuration information.

In various implementations, the schema files include schema definitions (e.g., Avro™ schema definitions, etc.), which may be data records (e.g., JSON records, etc.). Schema definitions may define multiple data fields which are organized in a data array such as a JSON array. Each data field identifies the field's name as well as its data type. The data type may be simple such as an integer or may be complex such as another record. As such, schema files may include data fields for containing data payload and data types.

At block 204, the system adds annotations to the one or more schema files. In various implementations, the annotations are associated with the data fields, where a given annotation may be applied against one or more data fields in a given schema file.

As described in more detail herein, the annotations indicate and describe data requirements in a contract. As described in more detail herein, annotations may be predetermined, and the annotations are associated with validators that validate the fields. The validators ensure that data payload in the fields comply with data requirements of the contract. The contract may be referred to as a requirements contract, which includes business requirements. In various implementations, a contract is an object model defined in a schema that is agreed upon by multiple parties (e.g., a publisher and consumers, etc.). The contract ensures that same object model is used to generate and consume data payload (e.g., JSON data payload.

As described in more detail herein, the system generates the object model with injected validation behavior via validators, which are used to validate system events. The validators ensure that fields of the system events comply with a contract. In some implementations, an event may include data files. In various implementations, a system event is a type of business event that results from system activity and that contains system data. A system event may be, for example, a Kafka event, which is a data payload sent by publisher to a Kafka topic to be consumed by subscribers.

As such, a system event may simply be a message broadcasted to listeners, for example.

In some implementations, data files may be JavaScript Object Notation (JSON) files. JSON files provide a text-based means of representing JavaScript object literals, arrays, and scalar data. Such JSON files are relatively easy for a user to read and write, and also easy for software to parse and generate. JSON files are often used, for example, for serializing structured data and exchanging it over a network, typically between a server and web applications. In various implementations, the schema files use JSON for defining data types and protocols, and serializing data in a compact binary format.

The system updates or adds to each field in a generated class with a configured set of one or more annotations that inject specific validation behavior.

The following is an example of a class field before enhancement, where annotations are not added:

private java.lang.String enterprisePartyIdentifier;

The following is an example of a class field after enhancement, where annotations are added:

```
@NameMatchRule
@EnterprisePartyIdentifierRule
private java.lang.String enterprisePartyIdentifier;
```

In various implementations, the system associates each annotation with a validator. Validators are specific commands for validation, or validation commands. In various implementations, the annotations are predefined. In various implementations, each annotation is constrained by an associated validator that ensures compliance with one or more predetermined requirements of a requirements contract with business requirements. For example, a validator ensures that the data in a class field complies with one or more predetermined requirements. Such requirements may include data type and data format requirements that are stated in a contract. In other words, each annotation injects validation of various data types and data formats in fields according to a contract. For example, the annotation @NameMatchRule ensures that the property name in the class will match a field name in JSON payload. In another example, the annotation @EnterprisePartyIdentifierRule ensures that the value is numeric and that the length of the string is a predetermined length (e.g., 10 characters long, etc.) per business requirement.

The following is a list of example predefined annotations. This list is extendable.

```
@interface RegexRule
@interface NumericRule
@interface ZipCodeRule
@interface NameMatchRule
@interface DateFormatRule
@interface InsightsNameRule
@interface LatLongCoordinateRule
@interface EnterprisePartyIdentifierRule
```

As indicated above, annotations inject validation of various data types and formats in the fields according to the contract with business requirements.

The following is a list of example predefined validators. This list is extendable.

```
@Target({FIELD})
@Retention(RUNTIME)
@Documented
@ Constraint(validatedBy = {DateFormatValidator.class})
public @interface DateFormatRule {
    String message( ) default "Invalid Date";
    Class<?>[ ] groups( ) default { };
    Class<? extends Payload>[ ] payload( ) default { };
}
```

As indicated above, each validator ensures compliance with one or more predetermined requirements of a contract. In various implementations, an annotation may be a form of syntactic metadata that is added to the source code (e.g., Java source code). Classes, methods, variables, parameters, and Java packages may be annotated. Validators are classes with validation behavior implementation that are injected into compiled code by a Java annotation processor. In various implementations, the system may receive validators associated with rules. The system may receive existing validators and/or newly created validators all of which support business requirements stated in contracts.

At block 206, the system generates an object model based on the one or more schema files and the annotations. The resulting generated object model is injected validation behavior, and may be referred to as an enhanced object model. In various implementations, an object model helps to describes and/or define a software or a system in terms of objects and classes. For example, an object model may define the interfaces or interactions between different models, inheritance, encapsulation, and other object-oriented interfaces and features. Schema files are object model definitions, which may be in JSON notation, for example. An object model may be generated from a schema by using a maven plugin (e.g., an Avro™-maven-plugin) during compilation of source code.

At block 208, the system receives one or more data files. In various implementations, the system receives the data files during production. Also, in various implementations, the data files are JSON files. In various implementations, there may be two stages in a process. For example, in a compilation stage, the system may manipulate schema to generate an enhanced object model. In a runtime stage, the system may use object model generated in the compilation stage to validate data payloads files, such as JSON data payload files.

At block 210, the system validates each of the one or more data files to ensure that the data files comply with the requirements contract. In various implementations, the validating is based on the object model. In various implementations, the system may use a schema file and annotations to generate an object model with injected validation behavior. In various implementations, based on rules in the configuration file and the validation implementation, the system validates the following. The system validates data payloads such as JSON data payloads for structural integrity in compliance with a contract. The system also validates fields. For example, the system may validate a name. In another example, the system may validate a field to ensure that a value is present if the field requires a value (e.g., per configuration). In another example, the system may validate the format of a field.

In various implementations, the system may utilize a class deserializer to perform validations. In some implementations, the class deserializer may be a generic class deserializer. In various implementations, the term generic is used in context of ability to use same deserializer to process data files such as JSON files for various object model definitions. For example, JSON data representing "Employee" or "Customer" may be processed by same deserializer with generic type <T>).

The following is an example class. In this example, the class is a public class.

public class AnnotatedClassDeserializer<T> implements
        JsonDeserializer<T>

This example class uses the generated object model, where the class is enhanced with annotations to validate data file payloads (e.g., JSON payloads). The system applies the validating behavior injected by the annotations against each property and/or field associated with a class dynamically during object instantiation (initialization). Example implementations of fields and properties are described below.

At block 212, the system compiles the validation errors based on the validation process of block 210. The system then generates a validation error report based on one or more validation errors, where the validation error report includes the validation errors. In various implementations, the report lists details of each validation error. In various implementations, data fields that validate (e.g., comply with the contract) may be referred to as valid events. In various implementations, data fields that do not validate or contain validation errors (e.g., do not comply with the contract) may be referred to as invalid events.

At block 214, the system sends out a report with the compiled validation errors.

At block 216, the system sends valid data files (events) to a database.

In various implementations, the system may utilize configuration files that contain validation rules. The configuration files enable developers to customize properties to validate, where the configuration files include validation rules to apply to the properties.

The following are example validation rules defined in an example validation file. This list is extendable. This example shows a binding of validation rules to a file in an object during generation. In various implementations, the binding of validation rules may be defined and associated with a field in the class of a generated objected based on the configuration file.

The following are further example validator types. In some implementations, a structure validator captures structure issues during the initialization of the object model with payload. For example, a JSON structure validator captures JSON structure issues during initialization of object model with payload.

A field name validator validates each property (e.g., JSON property) for a name match with the schema files.

A field value validator performs a second level of validation to check requirements of fields (e.g., check for null or empty values, etc.). For example, if a required field is missing data, the system generates an appropriate error message and appends the error message to a report. The system generates similar error messages associated with failed validations described herein and appends such error messages to the report.

A field format validator performs validations at more granular, data validation levels. This enables the system to enforce validation rules on a data format and also validate expected values in a field. In various implementations, the expected values are actual values that are expected in the data (e.g., JSON data) based on business requirements of a contract.

In an example validation, presume that a received data file (e.g., JSON file) has missing resource type names in each section of the JSON file, and also has couple of data issues, including an invalid date format and invalid length of enterprise party identifier field. Validation results without injected validation behavior (e.g., no added annotation as described herein) would not yield any validation errors. A user would need to manually discover such errors. In contrast, validation results with injected validation behavior (e.g., annotations have been added as described herein) would yield validation errors. Furthermore, the report would detail such validation errors based on the same data file.

The following report below precisely shows validation errors in the data file (e.g., JSON) payload received. The report also suggests ways to remediate the errors.

```
# Validation Rules defined in configuration (example)
any.asOfDate=DateFormatRule(fieldName = "asOfDate")
any.startDate=RequiredRule(fieldName = "startDate");DateFormatRule(fieldName =
"startDate")
any.enterprisePartyIdentifier=EnterprisePartyIdentifierRule
```

```
***************** VALIDATION ERRORS *****************
Class Channel -> Invalid Resource Type Name, Provided: [ 'null' ]
Class Channel -> Json is missing field: [ resourceTypeName ]
Class Channel -> Resource Type Code is invalid for provided insights name
'channelInsights'. Valid codes: {
  inStoreAndOnline,
  inStore,
  online,
  noView
}, Provided: [ 'primary' ]
Class Demographic -> Invalid Resource Type Name, Provided: [ 'null' ]
Class Demographic -> Json is missing field: [ resourceTypeName ]
Class Demographic -> Resource Type Code is invalid for provided insights name
'demographicInsights'. Valid codes: {
  merchant,
  merchant_lastSixMonths,
  industry,
  noView
}, Provided: [ 'alternative1' ]
Class Geographic -> Invalid Resource Type Name, Provided: [ 'null' ]
Class Geographic -> Json is missing field: [ resourceTypeName ]
Class Geographic -> Resource Type Code is invalid for provided insights name
'geographicInsights'. Valid codes: {
  physicalTerminal_Merchant,
  virtualTerminal_Merchant,
  physicalTerminal_Industry,
  virtualTerminal_Industry,
  noView
}, Provided: [ 'primary' ]
Class MerchantWeeklySummaryInsight -> Enterprise Party Identifier must be 10 char
long, Provided: [ '278406721' ]
Class MerchantWeeklySummaryInsight -> asOfDate must have a format yyyymmdd,
Provided: [ '2020/09/01' ]
Class PurchasePattern -> Invalid Resource Type Name, Provided: [ 'null' ]
Class PurchasePattern -> Json is missing field: [ resourceTypeName ]
Class PurchasePattern -> Resource Type Code is invalid for provided insights name
'purchasePatternInsights'. Valid codes: {
  merchant,
  merchant_lastSixMonths,
  industry,
  noView
}, Provided: [ 'primary' ]
Class Sales -> Invalid Resource Type Name, Provided: [ 'null' ]
Class Sales -> Json is missing field: [ resourceTypeName ]
Class TimeOfPurchase -> Invalid Resource Type Name, Provided: [ 'null' ]
Class TimeOfPurchase -> Json is missing field: [ resourceTypeName ]
Class TimeOfPurchase -> Resource Type Code is invalid for provided insights name
'timeOfPurchaseInsights'. Valid codes: {
  nonBatchProcessor,
  batchProcessor,
  noView
}, Provided: [ 'primary' ]
```

Implementations described herein provide various benefits. For example, implementations validate fields of received data files such as JSON files. Implementations perform validations that are easy to configure and implement. Implementations also inject validation behavior into schema files, which enables the system to validate incoming or outgoing data on the fly.

Figure 3:
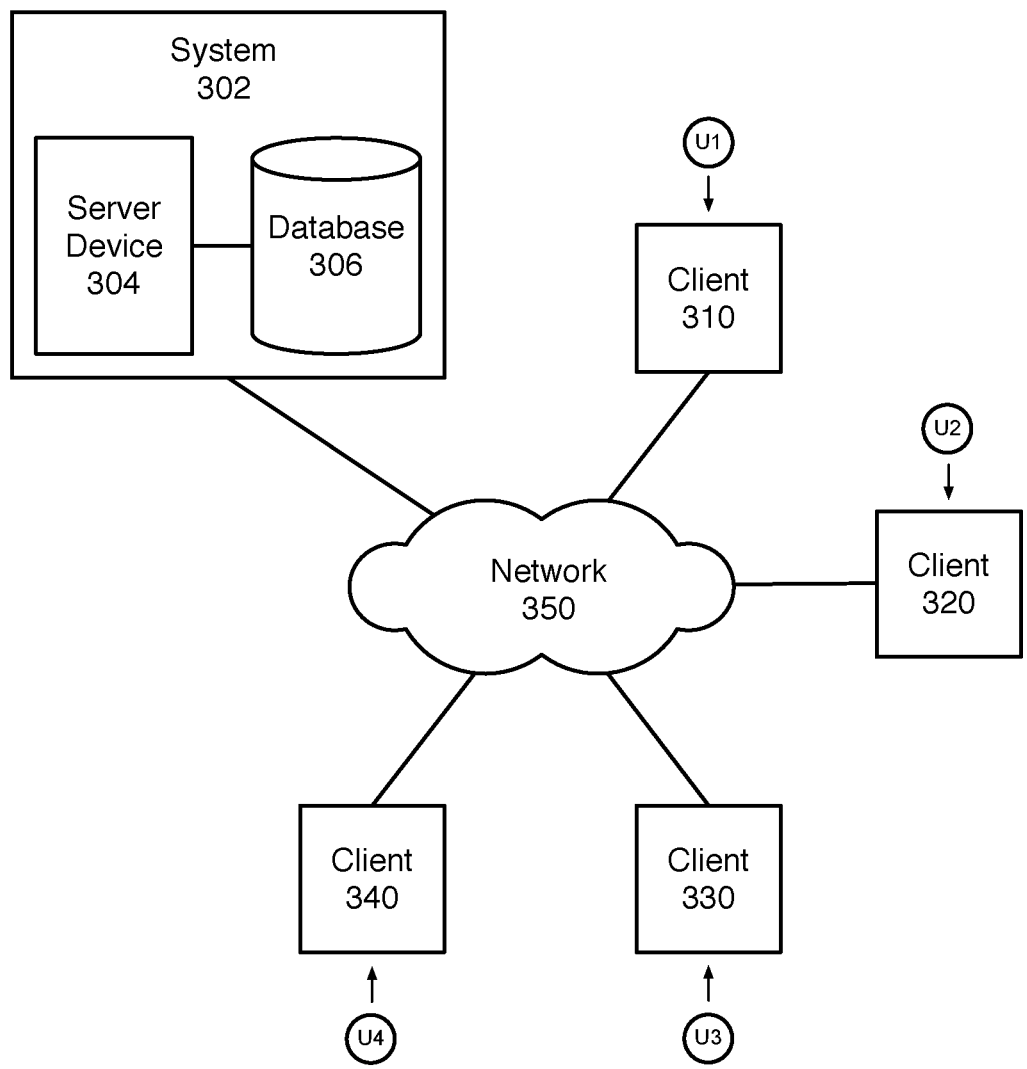
FIG. 3 is a block diagram of an example network environment, which may be used for some implementations described herein.

FIG. 3 is a block diagram of an example network environment 300, which may be used for some implementations described herein. In some implementations, network environment 300 includes a system 302, which includes a server device 304 and a database 306. For example, system 302 may be used to implement system 100 of FIG. 1, as well as to perform implementations described herein. Network environment 300 also includes client devices 310, 320, 330, and 340, which may communicate with system 302 and/or may communicate with each other directly or via system 302. Network environment 300 also includes a network 350 through which system 302 and client devices 310, 320, 330, and 340 communicate. Network 350 may be any suitable communication network such as a Wi-Fi network, Bluetooth network, the Internet, etc.

For ease of illustration, FIG. 3 shows one block for each of system 302, server device 304, and network database 306, and shows four blocks for client devices 310, 320, 330, and 340. Blocks 302, 304, and 306 may represent multiple systems, server devices, and network databases. Also, there may be any number of client devices. In other implementations, environment 300 may not have all of the components shown and/or may have other elements including other types of elements instead of, or in addition to, those shown herein.

While server device 304 of system 302 performs implementations described herein, in other implementations, any suitable component or combination of components associated with system 302 or any suitable processor or processors associated with system 302 may facilitate performing the implementations described herein.

In the various implementations described herein, a processor of system 302 and/or a processor of any client device 310, 320, 330, and 340 cause the elements described herein (e.g., information, etc.) to be displayed in a user interface on one or more display screens.

Figure 4:
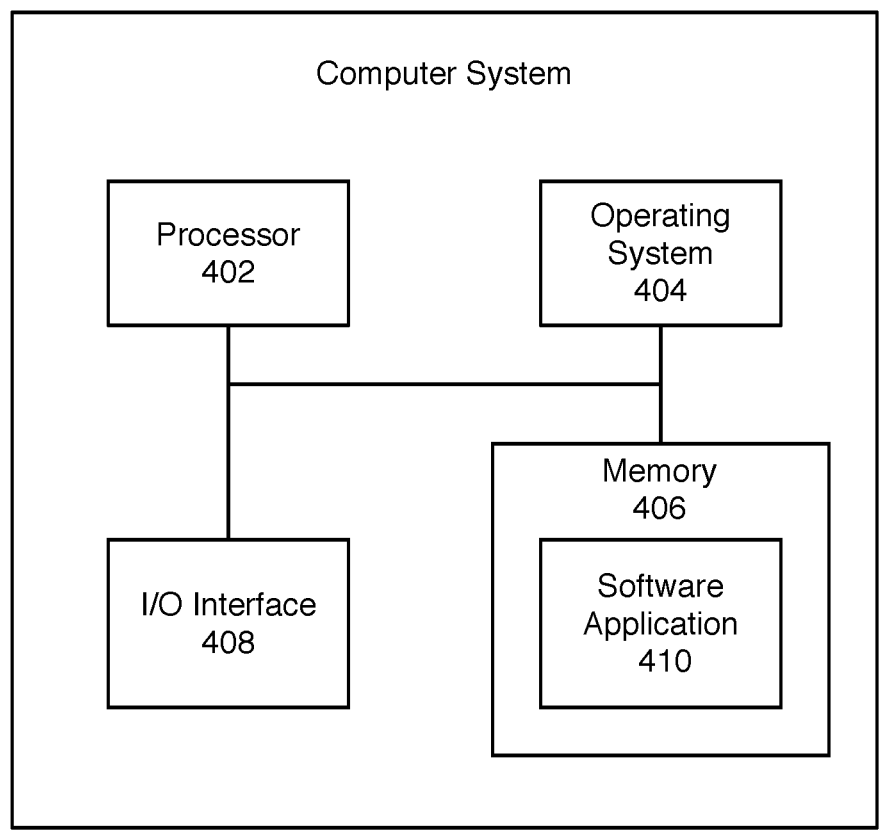
FIG. 4 is a block diagram of an example computer system, which may be used for implementations described herein.

FIG. 4 is a block diagram of an example computer system 400, which may be used for some implementations described herein. For example, computer system 400 may be used to implement server device 304 of FIG. 3 and/or system 100 of FIG. 1, as well as to perform implementations described herein. In some implementations, computer system 400 may include a processor 402, an operating system 404, a memory 406, and an input/output (I/O) interface 408. In various implementations, processor 402 may be used to implement various functions and features described herein, as well as to perform the method implementations described herein. While processor 402 is described as performing implementations described herein, any suitable component or combination of components of computer system 400 or any suitable processor or processors associated with computer system 400 or any suitable system may perform the steps described. Implementations described herein may be carried out on a user device, on a server, or a combination of both.

Computer system 400 also includes a software application 410, which may be stored on memory 406 or on any other suitable storage location or computer-readable medium. Software application 410 provides instructions that enable processor 402 to perform the implementations described herein and other functions. Software application 410 may also include an engine such as a network engine for performing various functions associated with one or more networks and network communications. The components of computer system 400 may be implemented by one or more processors or any combination of hardware devices, as well as any combination of hardware, software, firmware, etc.

For ease of illustration, FIG. 4 shows one block for each of processor 402, operating system 404, memory 406, I/O interface 408, and software application 410. These blocks 402, 404, 406, 408, and 410 may represent multiple processors, operating systems, memories, I/O interfaces, and software applications. In various implementations, computer system 400 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
receiving at least one schema file, wherein the at least one schema file includes data fields;
adding annotations to the at least one schema file, wherein the annotations are predefined annotations that are added automatically by the system to one or more class fields in the at least one schema file, and wherein the annotations are used to inject specific validation behavior;
generating an object model based on the at least one schema file and the annotations;
receiving at least one data file; and
validating the at least one data file based on the object model to ensure that the at least one data file complies with a requirements contract.

2. The system of claim 1, wherein the one or more annotations describe requirements in a contract.

3. The system of claim 1, wherein annotations are associated with validators.

4. The system of claim 1, wherein the annotations are constrained by validators that ensure compliance with requirements of a contract.

5. The system of claim 1, wherein the validating is performed by a class deserializer.

6. The system of claim 1, wherein the logic when executed is further operable to cause the one or more processors to perform operations comprising compiling validation errors based on the validating.

7. The system of claim 1, wherein the logic when executed is further operable to cause the one or more processors to perform operations comprising generating a validation error report based on one or more validation errors.

8. A non-transitory computer-readable storage medium with program instructions stored thereon, the program instructions when executed by one or more processors are operable to cause the one or more processors to perform operations comprising:
receiving at least one schema file, wherein the at least one schema file includes data fields;
adding annotations to the at least one schema file, wherein the annotations are predefined annotations that are added automatically by the system to one or more class fields in the at least one schema file, and wherein the annotations are used to inject specific validation behavior;
generating an object model based on the at least one schema file and the annotations;
receiving at least one data file; and
validating the at least one data file based on the object model to ensure that the at least one data file complies with a requirements contract.

9. The non-transitory computer-readable storage medium of claim 8, wherein the one or more annotations describe requirements in a contract.

10. The non-transitory computer-readable storage medium of claim 8, wherein annotations are associated with validators.

11. The non-transitory computer-readable storage medium of claim 8, wherein the annotations are constrained by validators that ensure compliance with requirements of a contract.

12. The non-transitory computer-readable storage medium of claim 8, wherein the validating is performed by a class deserializer.

13. The non-transitory computer-readable storage medium of claim 8, wherein the instructions when executed are further operable to cause the one or more processors to perform operations comprising compiling validation errors based on the validating.

14. The non-transitory computer-readable storage medium of claim 8, wherein the instructions when executed are further operable to cause the one or more processors to perform operations comprising generating a validation error report based on one or more validation errors.

15. A computer-implemented method comprising:
receiving at least one schema file, wherein the at least one schema file includes data fields;
adding annotations to the at least one schema file, wherein the annotations are predefined annotations that are added automatically by the system to one or more class fields in the at least one schema file, and wherein the annotations are used to inject specific validation behavior;
generating an object model based on the at least one schema file and the annotations;
receiving at least one data file; and
validating the at least one data file based on the object model to ensure that the at least one data file complies with a requirements contract.

16. The method of claim 15, wherein the one or more annotations describe requirements in a contract.

17. The method of claim 15, wherein annotations are associated with validators.

18. The method of claim 15, wherein the annotations are constrained by validators that ensure compliance with requirements of a contract.

19. The method of claim 15, wherein the validating is performed by a class deserializer.

20. The method of claim 15, further comprising compiling validation errors based on the validating.

* * * * *